C. F. PEARSON.
BEARING FOR LOOSE PULLEYS.
APPLICATION FILED APR. 10, 1919.
1,338,091.
Patented Apr. 27, 1920.
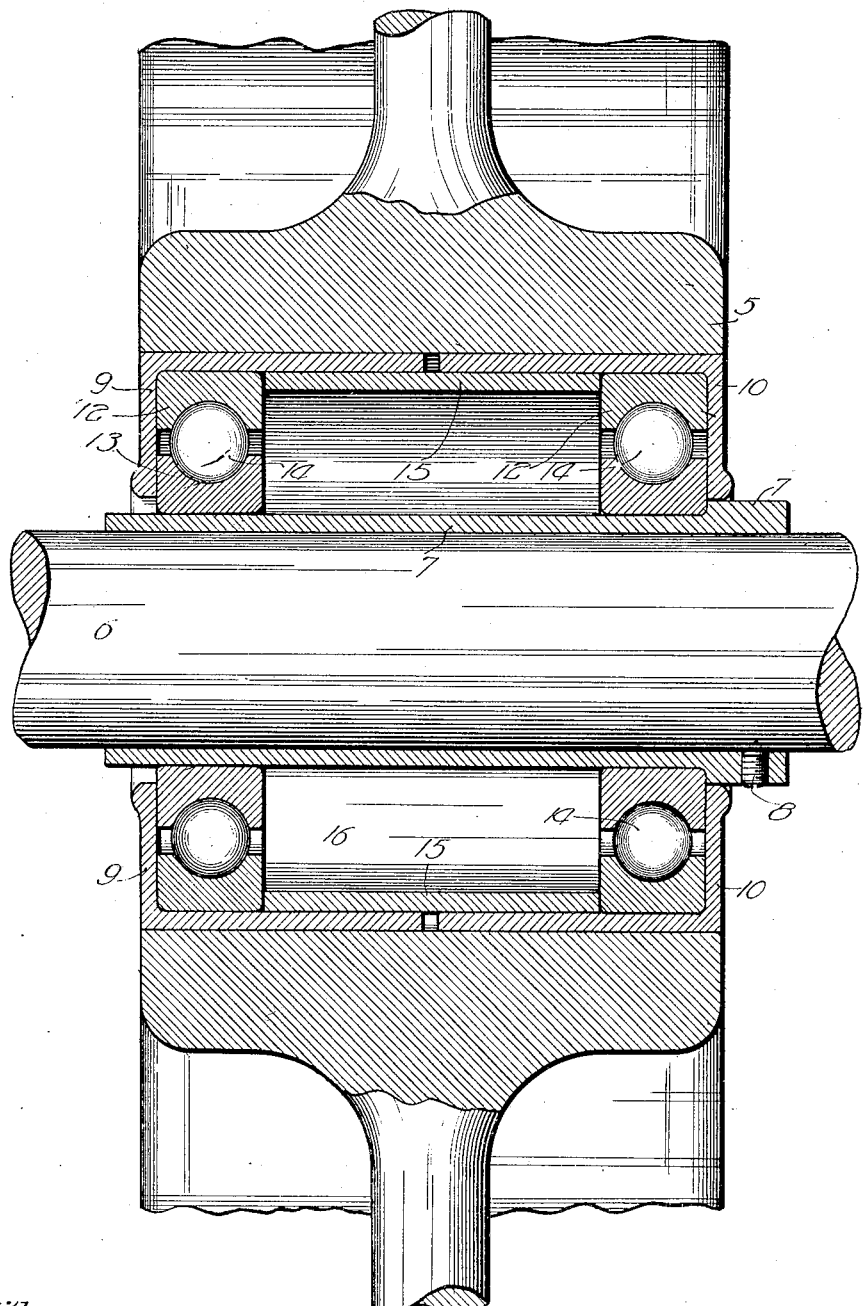
Witnesses:
Arthur W. Carlson
Robert H. Ellein
Inventor:
Carl F. Pearson
by Jones, Bain & Bean
Attys.

UNITED STATES PATENT OFFICE.

CARL F. PEARSON, OF CHICAGO, ILLINOIS, ASSIGNOR TO CHICAGO MACHINE & MOTOR CO., OF CHICAGO, ILLINOIS, A CORPORATION OF ILLINOIS.

BEARING FOR LOOSE PULLEYS.

1,338,091.  Specification of Letters Patent.  Patented Apr. 27, 1920.

Application filed April 10, 1919. Serial No. 289,079.

*To all whom it may concern:*

Be it known that I, CARL F. PEARSON, a citizen of the United States, residing at Chicago, in the county of Cook and State of Illinois, have invented certain new and useful Improvements in Bearings for Loose Pulleys, of which the following is a specification.

The invention relates to improvements in bearings for loose pulleys.

A so-called loose pulley, while not required, in any situation, to transmit power, is nevertheless a difficult piece of machinery to properly lubricate and keep in order. The shaft upon which it is mounted is in constant rotation, within the pulley, and on account of this continuous service, frequent and sufficient lubrication is necessary and required, when the usual bearing is used.

It has long been a vexing problem to practically eliminate friction between the rotating shaft and the relatively stationary loose pulley to prevent excessive wear of the bearing and short life of the pulley. One of the objects of the invention is to provide a self contained bearing structure, which interposes very little resistance to rotation and which is readily insertible in the hub of a pulley, having its bearing members spaced apart and firmly held in spaced relation and in association with a sleeve upon which the bearing members are mounted, that may, when necessary, be separately located upon the shaft, subsequently to receive the pulley.

In the drawings 5 is the hub of a loose pulley bored out to receive the ball bearing structure. 6 is the shaft upon which the pulley and the ball bearing structure is mounted and 7 is a removable sleeve that may be secured on the shaft to prevent its longitudinal movement by a set screw 8. The ball bearing structure comprises two cup shaped housing members 9 and 10, which may be formed up of sheet metal or cast and turned up as preferred. The bearing members each consisting of the rings 12 and 13, with the intervening balls 14, may be placed in the respective cup members and forced into their positions shown before the parts of the bearings are assembled in the hub of the pulley. The rings 13 fit neatly over the sleeve 7 and the rings 12 fit neatly in the cups 9 and 10, respectively. When the cup-shaped members 9 and 10 are ready to be placed within the hub 5 of the pulley, the spacing ring 15 is first placed in one of the cup-shaped members of the housing and then the two housing members, with the ball bearing members are forced into the hub. The spacing ring 15 holds the bearing members, 12—13, in their places within the respective cup-shaped members.

Any means to prevent axial movement of the pulley on the sleeve 7 may be employed but usually the crown face of the pulley is sufficient in its coöperation with the belt, to hold the pulley in its proper position.

A quantity of oil may be placed in the annular space 16 which is between the respective bearing members and bounded by the ring 15. The lubrication, as specified, is not essentially necessary for the operation of the device, but it contributes largely to the longevity of the bearings and inasmuch as it is contained within the closed cups and as the centrifugal effect of the shaft and pulley have no influence to throw it out, it is advantageous and will not produce an untidy appearance of the pulley.

Having described my invention, what I claim is:—

A loose pulley providing a hub with a concentric bore, having in coöperative association two cup-shaped retaining members, with their open ends facing each other and their inwardly converging walls in substantially the same radial plane as the outside surface of the pulley hub to provide a closed bearing housing; a ball bearing structure within each cup, near the respective radially disposed wall thereof; a spacing ring in said cups for holding the bearing members in place, within the cups, and neatly fitting said cups, and a sleeve within said housing for a neat fit with the shaft upon which the pulley is to be supported.

In testimony whereof I hereunto subscribe my name.

CARL F. PEARSON.